Patented May 3, 1927.

1,627,170

UNITED STATES PATENT OFFICE.

OSCAR GERLACH, OF LA SALLE, ILLINOIS.

MANUFACTURE OF HYDRAULIC CEMENT AND THE LIKE.

No Drawing. Application filed October 9, 1924. Serial No. 742,618.

This invention relates to the production of hydraulic cements and the like.

It is well-known that silicious limestone when burnt possesses hydraulic properties. Non-silicious limestone and dolomites while capable of making mortar are not hydraulic in their properties.

The principal object of this invention is to provide a method of converting such limestones into hydraulic cements.

Other and further important objects of the invention will hereinafter appear.

I have found that lime which has been burnt in the presence of zinc oxide slakes much more slowly than lime not so treated. This aids in the production of a hydraulic cement when suitable silicious material is added.

In carrying out my invention, therefore, I burn limestone or dolomite in a kiln with zinc retort ashes, low grade zinc ore or other similar materials. Zinc retort ashes ordinarily contain 50 to 60% unburnt carbon and 6 to 8% zinc, the remainder being chiefly silicates of iron, alumina, etc.

In the kiln the zinc is reduced to metal by the carbon present, volatilized and then later burnt to zinc oxide and deposited as such on the lime.

The carbon in the ashes burns with the coal added so that when the contents of the kiln are removed the product consists of lime, which, as will be explained, is impregnated and coated with zinc oxide, and silicates of iron, alumina, etc. This product makes an excellent hydraulic cement.

Ordinarily limestone is not decomposed into lime and carbon dioxide below 850° C. Further, zinc does not boil below 918° C. so that to bring about the desired reactions the temperature should be around 950° to 1000° C. or about 1600°–1700° F. Since this range is below the volatilizing temperature of zinc oxide in a current of air (about 1100° C.), the zinc oxide formed is deposited on the surface and in the pores of the burnt lime instead of being carried out of the kiln.

The materials may be burnt in either a vertical or rotary type of kiln. In the former case the materials must be arranged so that gases may pass upwardly through the mass. Thus the limestone or dolomite is inserted in the vertical kiln in the form of lumps or blocks 6″ to 8″ in diameter. In this case the material containing zinc should be mixed with the coal used as fuel. In the rotary type of kiln the materials may be crushed to any desired degree of fineness. In the case the material is burned in a rotary or revolving kiln, the retort ashes or other material containing zinc, could be either mixed with the limerock or dolomite in right proportions, or mixed with and ground with the coal used as fuel to a fine powder and blown in at the discharge end of the kiln.

The carbonate used may be either substantially wholly calcium carbonate or a mixture of calcium and magnesium carbonates such as dolomite. The higher the proportion of calcium carbonate, however, the more retort ashes required. For a rock containing equal amounts of calcium and magnesium carbonates about 15 parts of retort ashes should be used for each 100 parts of rock.

After furnacing the product is ground and, where a vertical kiln has been used, thoroughly mixed.

I am aware that numerous details of the process may be varied through a wide range without departing from the spirit of this invention, and I do not desire limiting the patent granted otherwise than as necessitated by the prior art.

I claim as my invention:

1. The product obtained by burning together material containing calcium carbonate and zinc retort ashes at a temperature below the clinkering temperature.

2. The process of making cement from dolomite materials comprising burning such materials with zinc retort ashes at a temperature below the clinkering temperature.

3. The process of making cement from materials containing calcium carbonate comprising heating such materials with zinc retort ashes and carbonaceous material to a temperature above 900° C. and below the clinkering temperature.

4. A process of making hydraulic cement and the like, which consists of mixing limestone with zinc retort ashes, burning said mixture without appreciable loss of zinc oxide content, and grinding the resulting mixture for use as cement.

5. The product obtained by burning together limestone and zinc retort ashes containing a small percentage of zinc, said product being impregnated and coated with zinc in the form of zinc oxide.

6. A process of making hydraulic cement, which comprises burning a mixture of calcium carbonate, zinc retort ashes and carbon at a temperature of approximately 950 to 1000° C., whereby the zinc is volatilized and then burned to zinc oxide and deposited as such on the lime, and crushing the burned product, which contains lime impregnated and coated with zinc oxide.

In testimony whereof I have hereunto subscribed my name.

OSCAR GERLACH.